(12) United States Patent
Yamada et al.

(10) Patent No.: US 6,517,082 B2
(45) Date of Patent: Feb. 11, 2003

(54) LIP SEAL

(75) Inventors: Takeshi Yamada, Kariya (JP);
Takayuki Imai, Kariya (JP); Yasuhiro Ikeda, Takahashi (JP)

(73) Assignees: Kabushiki Kaisha Toyoda Jidoshokki Seisakusho, Kariya (JP); Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 09/845,832

(22) Filed: May 1, 2001

(65) Prior Publication Data

US 2002/0003337 A1 Jan. 10, 2002

(30) Foreign Application Priority Data

May 2, 2000 (JP) .......................................... 2000-133233

(51) Int. Cl.$^7$ ................................................. F16J 15/32
(52) U.S. Cl. ...................... 277/559; 277/560; 277/562; 277/565
(58) Field of Search ................................. 277/559, 560, 277/562, 565

(56) References Cited

U.S. PATENT DOCUMENTS

| | | | | |
|---|---|---|---|---|
| 3,785,660 A | * | 1/1974 | Bush | 277/559 |
| 3,913,925 A | * | 10/1975 | Gyory | 277/559 |
| 4,288,083 A | * | 9/1981 | Braconier | 277/559 |
| 5,664,651 A | * | 9/1997 | Miura et al. | 188/322.17 |
| 5,860,656 A | * | 1/1999 | Obata et al. | 277/549 |
| 6,123,514 A | * | 9/2000 | Kawaguchi et al. | 277/559 |
| 6,182,975 B1 | * | 2/2001 | Matsushima et al. | 277/559 |
| 6,334,618 B1 | * | 1/2002 | Ohta et al. | 277/549 |

* cited by examiner

*Primary Examiner*—Anthony Knight
*Assistant Examiner*—Christopher Boswell
(74) *Attorney, Agent, or Firm*—Jacobson Holman PLLC

(57) ABSTRACT

An elastomer lip member with its rear supported by a pressure resisting back-up ring, and a synthetic resin lip member arranged on a rear side of the elastomer lip are comprised, and on the inner circumferential surface of the seal lip portion of the elastomer lip member, helical grooves generating a pumping action of a fluid introducing direction from an inner space of machine side when a shaft rotates are formed. When a pressure in the inner space of machine is MPa (gage), by making a contact width between the seal lip portion of the elastomer lip member and a shaft at least 0.6 mm, so that a surface pressure maximum portion of the seal lip portion of the elastomer lip member to the shaft is biased or maldistributed toward its rear side whereby a fluid introduction by said helical grooves is performed satisfactorily.

3 Claims, 5 Drawing Sheets rubber lip contact width (when pressing with 1 MPa [gage])

(A)

(B)

(C)

(D)

000# LIP SEAL

FIELD OF THE INVENTION

The present invention relates to a lip seal for sealing a shaft in various rotary machines, more particularly, a technology for improving a pressure resistance under a condition that a pressure of sealing object fluid becomes high prominently and a sealing capability when the shaft stops.

DESCRIPTION OF THE RELATED ART

Conventionally, as an apparatus for sealing a shaft, there was a lip seal 100 as shown in FIG. 5. The lip seal 100 has a structure that an elastomer lip member 102, a pressure resisting metal back-up ring 103 which supports the elastomer lip member 102 on its rear side (a side opposite to an inner space of machine S1 of a sealing object), a lip member 104 made of a low frictional synthetic resin such as PTFE arranged on the rear side of the pressure resisting back-up ring 103, and an outer metal back-up ring 105 closely provided on the rear side of a synthetic resin lip member 104 support their each outer diameter portion in a closely adhered state each other on an inner circumference of a metal tubular case 101 which is inserted and fixed in an inner circumference of a shaft hole housing 1 through an O-ring 106.

The elastomer lip member 102 has helical grooves 102b which performs a pumping action to introduce fluid in the inner space of machine S1 on an inner circumference surface of a seal lip portion 102a of an inner diameter side extending to the inner space of machine S1 of the sealing object, thereby, a sliding load with a rotating shaft 2 is reduced, accordingly, a leakage of fluid in the inner space of machine S1 is prevented mainly when the shaft stops. Further, the elastomer lip member 102 has a support shape by the pressure resisting back-up ring 103 is set to diminish a contact width W of the seal lip portion 102a to the rotating shaft 2 at the minimum when a fluid pressure in the inner space of machine S1 is 1 MPa [gage], thereby, intends to reduce the sliding load.

Further, the synthetic resin lip member 104, mainly when the shaft rotates, prevents the sealing object fluid in the inner space of machine S1 that has passed a sliding portion of the elastomer lip member 102 from leaking toward an atmosphere S2 side.

However, if the lip seal 100 of said conventional structure is slid in high pressure condition, for example, at least 10 MPa [gage], as shown in FIG. 6, a wear C which is an unusually large cut away shape is generated on a contact surface with the rotating shaft 2 and a portion adjacent to the atmosphere side in the seal lip portion 102a, and for extreme example, the cut away wear C penetrates said seal lip portion 102a in the direction of thickness, thus a sealing function cannot be served when the shaft stops, though a lubrication by pumping action of the helical grooves 102b and limitation of the contact width W is intended for the elastomer lip member 102.

This, as a result of inventor's study, as shown in FIG. 7, is considered because a maximum portion $P_{MAX}$ of a surface pressure P of the seal lip portion 102a to the outer circumferential surface of the rotating shaft 2 is locally distributed in the inner space of machine S1 so that the lubrication by pumping action of the helical grooves 102b is disturbed in the high pressure condition.

SUMMARY OF THE INVENTION

The object of the present invention is to provide a lip seal which, even if high pressure is formed in a sealing space when a shaft rotates, a lubrication of the seal lip portion of the elastomer lip member is maintained and a cut away wear is restrained, so that a sealing capability is not damaged when the shaft stops.

A lip seal according to the present invention comprises an elastomer lip member having a seal lip portion at an inner side extending toward a sealed space, which is brought into slide contact with an outer circumferential surface of a rotating shaft sealably, a rear thereof being supported with a pressure resisting back-up ring; and a synthetic resin lip member having a seal lip portion of an inner side, which is arranged at a rear side of the elastomer lip member and extends to a sealing space so as to be brought into slide contact with an outer circumferential surface of said rotating shaft at a side opposite to the sealed space from the seal lip portion of said elastomer lip member. The pressure resisting back-up ring is placed between the elastomer lip member and the elastomer lip member. Pumping threads generating a pumping action of a fluid introducing direction from said sealed space side when the shaft rotates are formed on the inner circumferential surface of the seal lip portion of said elastomer lip member. And, when a pressure of said sealing space is 1 MPa [gage], a contact width between the seal lip portion of said elastomer lip member and the rotating shaft is set to be at least 0.6 mm, so that a maximum portion of surface pressure of the seal lip portion of the elastomer lip member to the rotating shaft is locally distributed or biased toward its rear side, whereby the fluid introduction by said pumping threads can be performed satisfactorily.

DETAILED DESCRIPTION OF THE PREFERRED EMBODIMENTS

Figure 1:
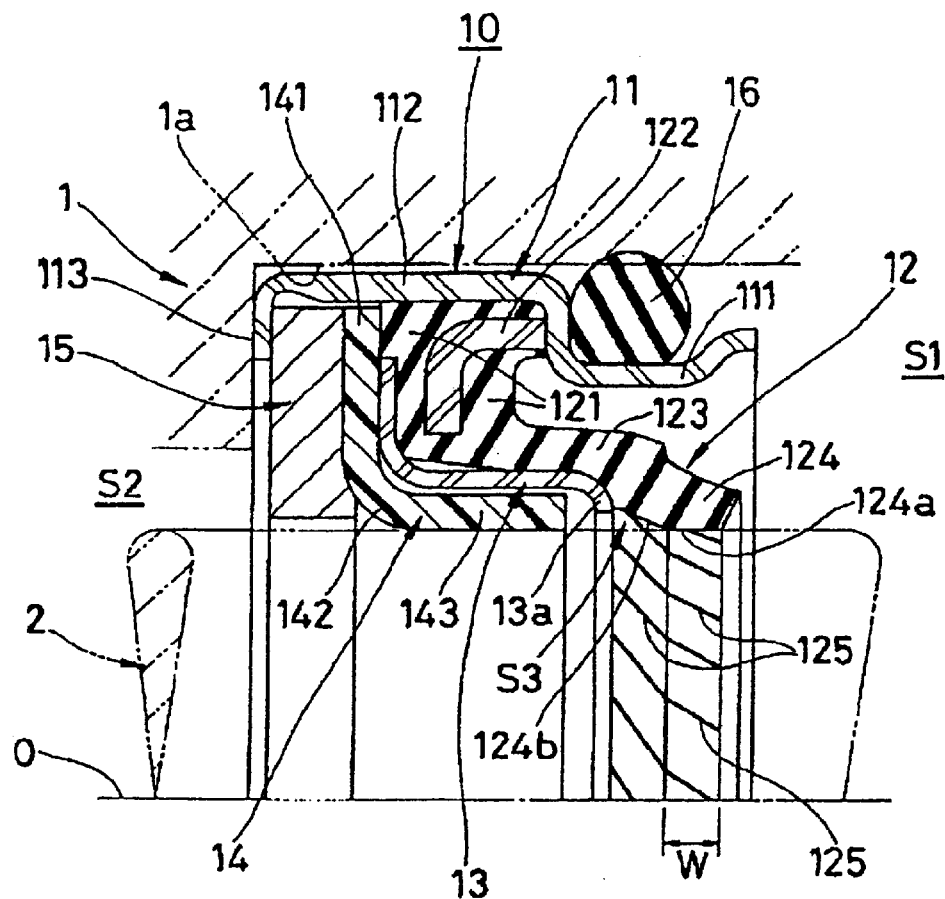
FIG. 1 is a half sectional view showing a preferred embodiment of a lip seal according to the present invention by cutting in a plane passing a shaft center in a mounted state.

FIG. 1 shows a preferred embodiment of a lip seal according to the present invention. In this figure, a reference numeral 1 designates a shaft hole housing of a machinery. A reference numeral 2 designates a rotating shaft that is inserted and passed an inner circumference of said shaft hole housing 1 and rotates about a shaft center 0. A reference numeral 10 designates a lip seal according to the present invention.

The lip seal 10 seals a shaft circumference of the rotating shaft 2 between an inner space of machine Si that is a sealing space and an atmosphere S2 side opposite to the sealing space. The lip seal 10 has a tubular metal case 11, an elastomer lip member 12 whose each outer circumference portion is supported in the inner circumference of the tubular case 11, a pressure resisting metal back-up ring 13, a synthetic resin lip member 14, and an outer metal back-up ring 15.

The tubular case 11 has an O-ring mounting portion 111 which is formed a concave shape toward the inner circumference side on an end potion of the inner space of machine S1 side and extending circumferentially, a cylindrical main body portion 112 extending toward a side opposite to the inner space of machine S1 from the O-ring mounting portion 111, and a caulking portion 113 bent toward the inner diameter side on an end portion opposite to the O-ring mounting portion 111 of the cylindrical main body portion 112. And, the tubular case 11 is adopted to press fit in the inner circumferential surface 1a of the housing 1 through an O-ring 16 mounted on said O-ring mounting portion 111.

The elastomer lip member 12 is made of an elastomer material such as a rubber and the like, and has an outer diameter base portion 121 in which a metal reinforcing ring 122 showing approximately L-shape section is embedded, a main body 123 curving and extending toward the inner diameter side and the inner space of machine S1 from the outer diameter base portion 121, and a seal lip portion 124 of which an inner circumferential surface is brought into slide contact with the outer circumferential surface of the rotating shaft 2.

The pressure resisting back-up ring 13 made of a metal plate such as a steel plate and the like is formed as a curved-shape along a rear of the elastomer lip member 12, and its front end portion 13a bent toward the inner diameter side reaches the rear of seal lip portion 124 of said elastomer lip member 12. That is, the pressure resisting back-up ring 13 restricts a deformation of the elastomer lip member 12 due to a fluid pressure of the inner space of machine S1 by supporting a portion spanning from the outer diameter base portion 121 of the elastomer lip member 12 to the main body 123 from its rear side.

The synthetic resin lip member 14 is comprised of a low frictional synthetic resin material such as PTFE, and shows a shape curving and extending from the inner circumference of an outer diameter portion 141 sandwiched and supported by the outer diameter base portion 121 of the elastomer lip member 12 and the outer diameter portion of the pressure resisting back-up ring 13, and the outer back-up ring 15 to the inner space of machine S1 side, and the inner circumferential surface of a seal lip portion 143 closes to the outer circumferential surface of the rotating shaft 2 at a position backed appropriately from the front end portion 13a of said pressure resisting back-up ring 13 toward the atmosphere S2 side. The outer backup ring 15 support the outer diameter portion 141 and a curved portion 142 of the synthetic resin lip member 14 on its rear.

The elastomer lip member 12, the pressure resisting back-up ring 13, the synthetic resin lip member 14 and the outer back-up ring 15 are sandwiched and fixed between the O-ring mounting portion 111 and the caulking portion 113 of the tubular case 11 in a state that their outer diameter portions are closely placed each other axially. And, the outer diameter base portion 121 of the elastomer lip member 12 is closely placed in an appropriately pressed state in the inner circumferential surface of the cylindrical main body 112 in the tubular case 11, thus functions as a gasket portion which maintains a gas tightness between the tubular case 11 and the elastomer lip member 12.

In the seal lip portion 124 of the elastomer lip member 12, a sliding surface 124a with the outer circumferential surface of the rotating shaft 2 and successive plural helical grooves 125 in the tapered shape inner circumferential surface of its rear side (a side opposite to the inner space of machine S1) are formed. The helical grooves 125 have a direction that causes a pumping action introducing fluid of the inner space of machine S1 side into the inner circumference of said seal lip portion 124 by the rotation of the rotating shaft 2.

Further, when a fluid pressure of the inner space of machine S1 is 1 MPa [gage], an axial length of said seal lip portion 124 from the front end portion 13a of the pressure resisting back-up ring 13 is longer than that of prior art so as to a contact width W of the seal lip portion 124 (width of the sliding surface 124a) of the elastomer lip member 12 to the outer circumferential surface of the rotating shaft 2 is at least 0.6 mm.

In the above constitution, when the shaft rotates, the fluid pressure of the inner space of machine S1 acts on the elastomer lip member 12, but the portion extending from the outer diameter base portion 121 of the elastomer lip member 12 to the main body 123 is supported from its rear side by the pressure resisting back-up ring 13, so that a deformation toward the inner diameter direction by said fluid pressure is restricted.

Figure 2:
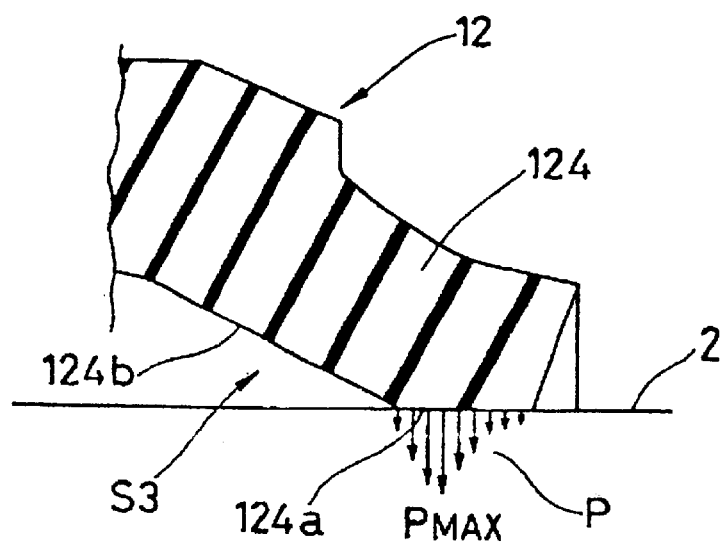
FIG. 2 is a diagram showing a surface pressure distribution of a sliding surface of the elastomer lip member in the lip seal of the present invention.

The seal lip portion 124 of the elastomer lip member 12 is not supported by the pressure resisting back-up ring 13, but, when the shaft rotates, fluid is actively introduced from the inner space of machine S1 to the sliding surface 124a by pumping action of the helical grooves 125 formed in said seal lip portion 124, and, when the fluid pressure of the inner space of machine S1 is 1 MPa [gage], the contact width W of said seal lip portion 124 (a width of the sliding surface 124a) to the rotating shaft 2 is at least 0.6 mm, so that, as shown in FIG. 2, the maximum portion $P_{MAX}$ of surface pressure P of the seal lip portion 124 to the outer circumferential surface of the rotating shaft 2 is locally distributed toward a rear space S3 side, thus an introduction of fluid by pumping action of the helical grooves 125 is facilitated to perform. Accordingly, in high pressure state which the fluid pressure of the inner space of machine S1 is at least 10 MPa [gage], a satisfactory lubrication film is formed in the sliding surface 124a with the rotating shaft 2 in said seal lip portion 124, thus an increase of sliding load and cut away wear by the same is restrained.

And, as stated above, when the shaft rotates, the elastomer lip member 12 does not show the sealing effect because the pumping of fluid introduction direction in helical grooves 125 is performed and a sealing to the inner space of machine S1 is mainly performed by the synthetic resin lip member 14.

When the shaft stops, a leakage direction pumping by the helical grooves 125 formed on the seal lip portion 124 of the elastomer lip member 12 is not performed. Accordingly, the pressure of the space S3 between the elastomer lip member 12 and the synthetic resin lip member 14 is lowered, so that said seal lip portion 124 becomes a close state with the outer circumferential surface of the rotating shaft 2 by an elasticity of the elastomer. Accordingly, when the shaft stops, the elastomer lip member 12 has an excellent sealing function.

Figure 3:
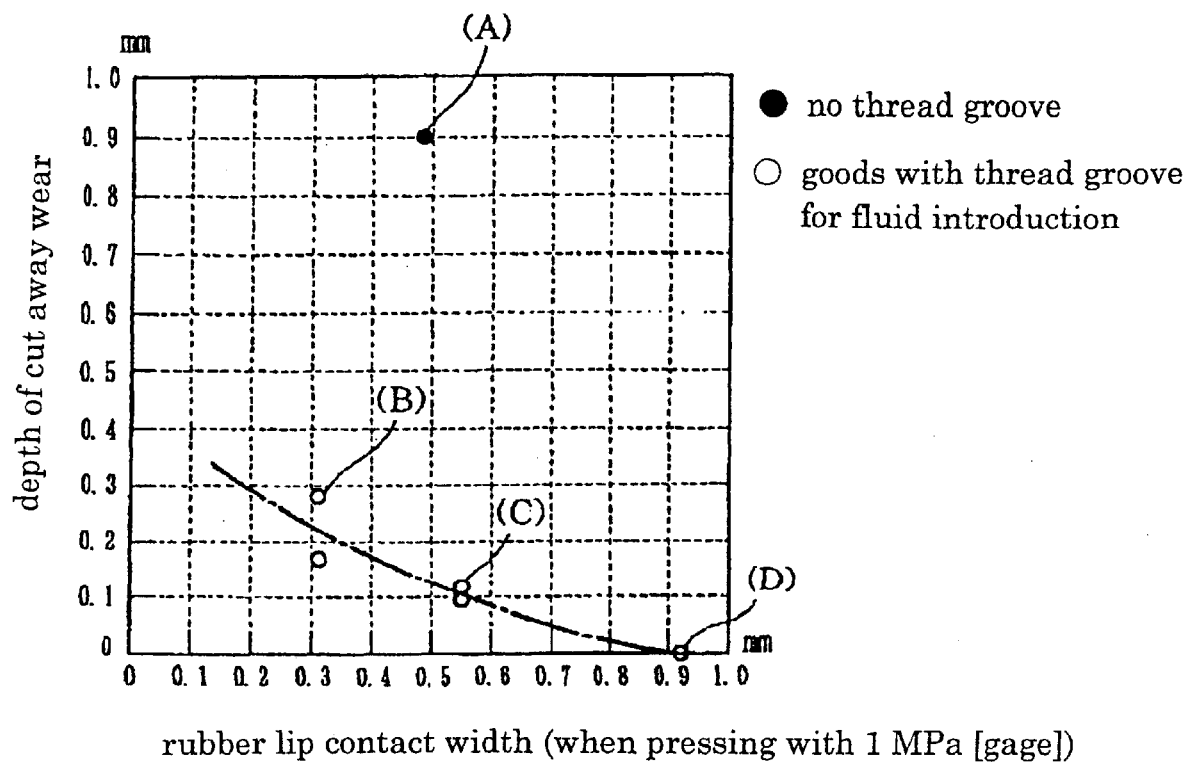
FIG. 3 is a diagram showing a result that relationship among a contact width of the seal lip portion of the elastomer lip member when pressing with 1 MPa [gage], helical grooves and a size of cut away wear which is generated in the seal lip portion is confirmed by a sliding test.
Figure 4:
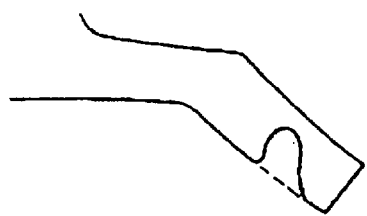
FIG. 4 is a diagram showing a sectional shape of cut away wear of each test sample in said sliding test.
Figure 4:
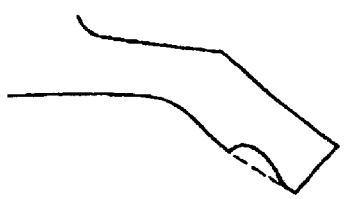
Figure 4:
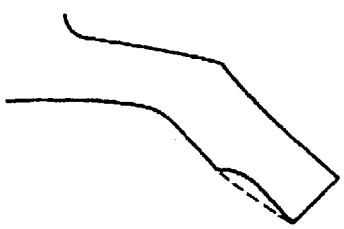
Figure 4:
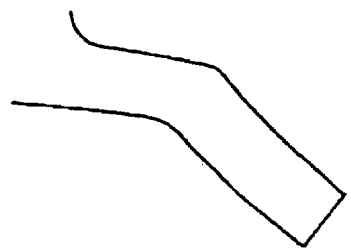
Figure 5:
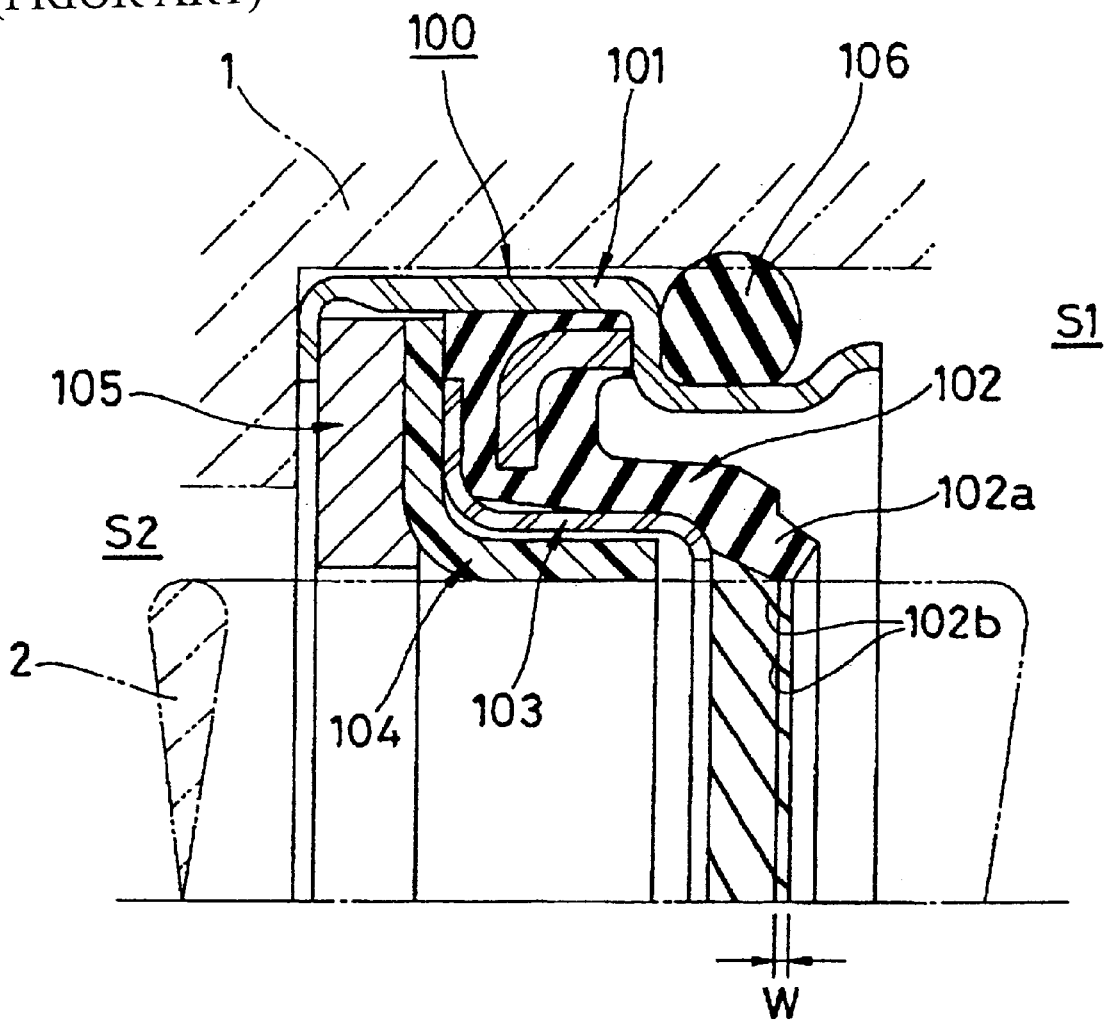
FIG. 5 is a half sectional view showing a conventional lip seal by cutting in a plane passing the shaft center in a mounted state.
Figure 6:
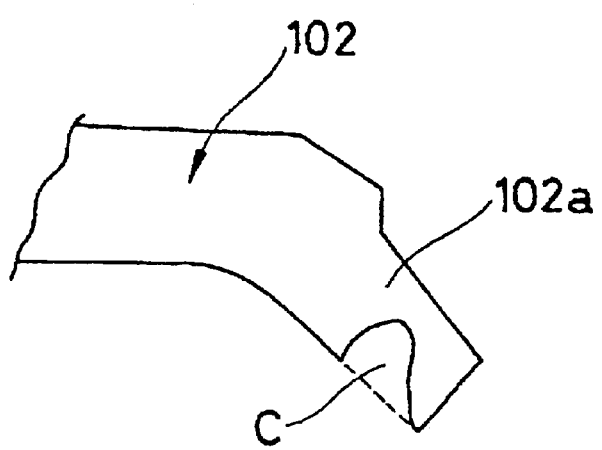
FIG. 6 is a diagram showing a sectional shape of cut away wear which is generated in the seal lip portion of the elastomer lip member in the conventional lip seal.
Figure 7:
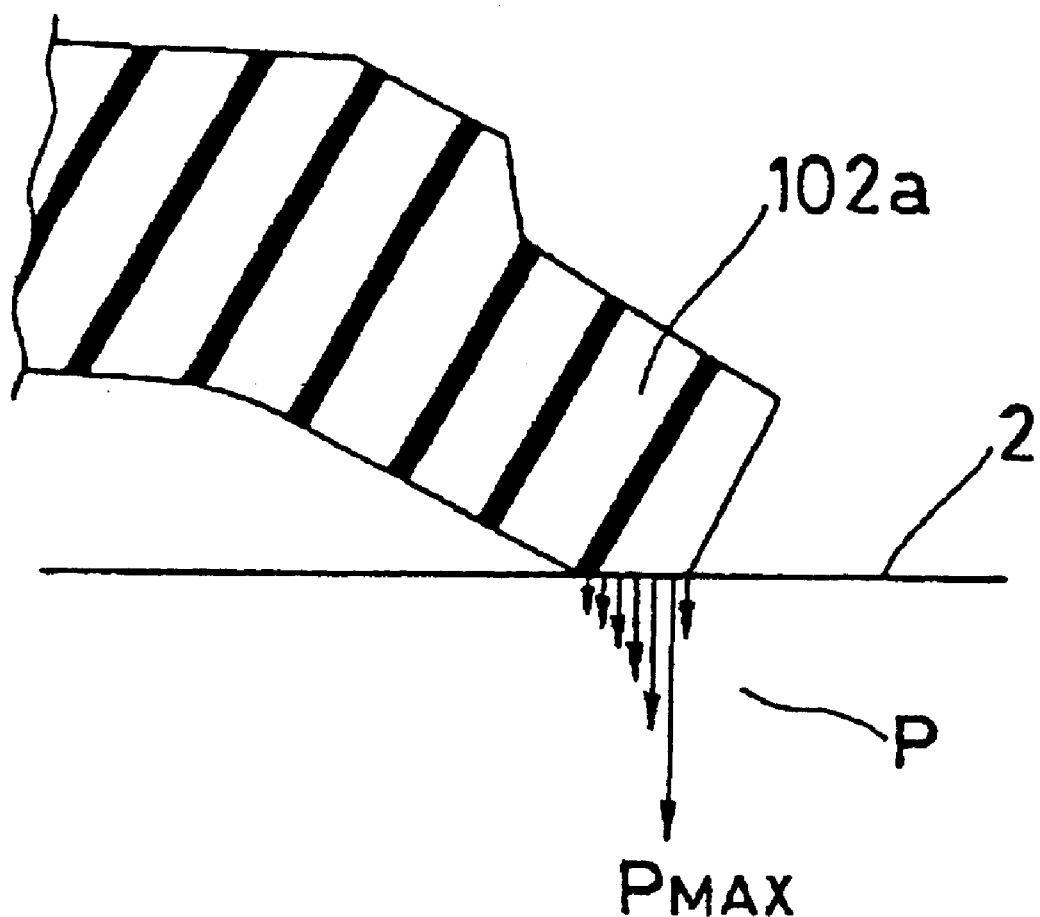
FIG. 7 is a diagram showing a surface pressure distribution of the sliding surface of the elastomer lip member in the conventional lip seal.

FIG. 3 shows a result that a sliding test of the lip seal in condition stated below is performed to confirm the effect by the present invention and relationship among the contact width of a seal lip portion 124 of the elastomer lip member 12 when pressing with 1 MPa [gage], helical grooves and a size of cut away wear which is generated in the seal lip portion 124 is confirmed, and FIG. 4 shows a sectional shape of cut away wear thereof.

[Test condition]

tester: single body rotating tester revolutions of rotating shaft: 2500 rpm pressure of inner space of machine: 12 MPa [gage]

temperature of sealing liquid: 65° C.

kind of sealing liquid: PAG oil (full)

test time: 2 hour

As a result of the test, in a test sample A which does not form the helical grooves 125 for introducing fluid on the seal lip portion 124 of the elastomer lip member 12, a depth of cut away wear after sliding for two hours in high pressure condition of 12 MPa [gage] reaches 0.9 mm. Contrary to this, it can be known that in test samples B–D which form the helical grooves 125 for introducing fluid on said seal lip portion 124, the cut away wear is small in comparison with the test sample A which does not form the helical groove, and the lager the contact width of the seal lip portion on pressing at 1 MPa [gage], the more restrained the wear. Further, from the test result, it can be known that, in a change trend of cut away wear by said contact width, if the contact width of the seal lip portion is at least 0.6 mm as shown by chain line in FIG. 3 when pressing at 1 MPa [gage], the depth of cut away wear is restrained to a minute wear shorter than 0.1 mm, and if said contact width is about 0.9 mm, almost no wear is confirmed.

According to the lip seal of the present invention, the lubrication of the sliding surface by the pumping threads formed on said seal lip portion is certainly performed by making the contact width of seal lip portion of the elastomer lip member at least 0.6 mm when pressing at 1 MPa [gage], so that cut away wear of the seal lip portion is restrained, and an excellent sealing capability of the elastomer lip member is maintained when the shaft stops.

What is claimed is:

1. A lip seal comprising:

an elastomer lip member, a pressure resisting back-up ring for supporting a rear portion of said elastomer lip member, a synthetic resin lip member arranged at a rear side of the elastomer lip member, said elastomer lip member having an inner circumferential surface of a seal lip portion, on which helical grooves are formed for generating a pumping action in a fluid introducing direction from an inner space of a machine when a shaft rotates so that when a pressure in the inner space of the machine is 1 MPa gage, a contact width between the seal lip portion of the elastomer lip member and the shaft is at least 0.6 mm.

2. A lip seal as defined in claim 1, wherein a surface pressure maximum portion of the seal lip portion of the elastomer lip member to the shaft is biased toward its rear side.

3. A lip seal comprising:

an elastomer lip member having a seal lip portion at an inner side which extends to a sealed space, the seal lip portion being brought into slide contact with an outer circumferential surface of a rotary shaft sealably, a pressure resisting back-up ring for supporting a rear portion of the elastomer lip member;

a synthetic resin lip member having a seal lip portion at an inner side and arranged at a rear side of the elastomer lip member, the synthetic seal lip member extending toward a sealed space and being brought into slide contact with an outer circumferential surface of the shaft at a side opposite to the sealed space; and pumping thread means formed on the inner circumferential surface of the seal lip portion of the elastomer lip member for generating a pumping action in a fluid introducing direction from the sealed space when the shaft rotates, wherein, when a pressure of the sealing space is 1 MPa gage, a contact width between the seal lip portion of the elastomer lip member and the rotary shaft is at least 0.6 mm.

* * * * *